No. 704,761. Patented July 15, 1902.
H. SCHAUB.
APPARATUS FOR THE MANUFACTURE OF GLASSWARE.
(Application filed Apr. 29, 1902.)
(No Model.)
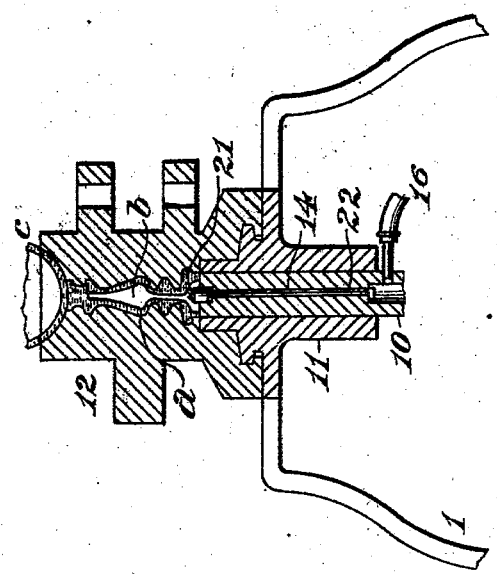
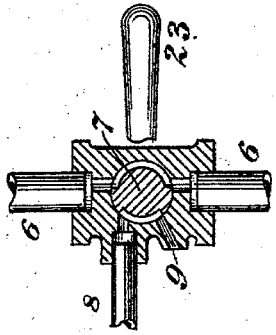
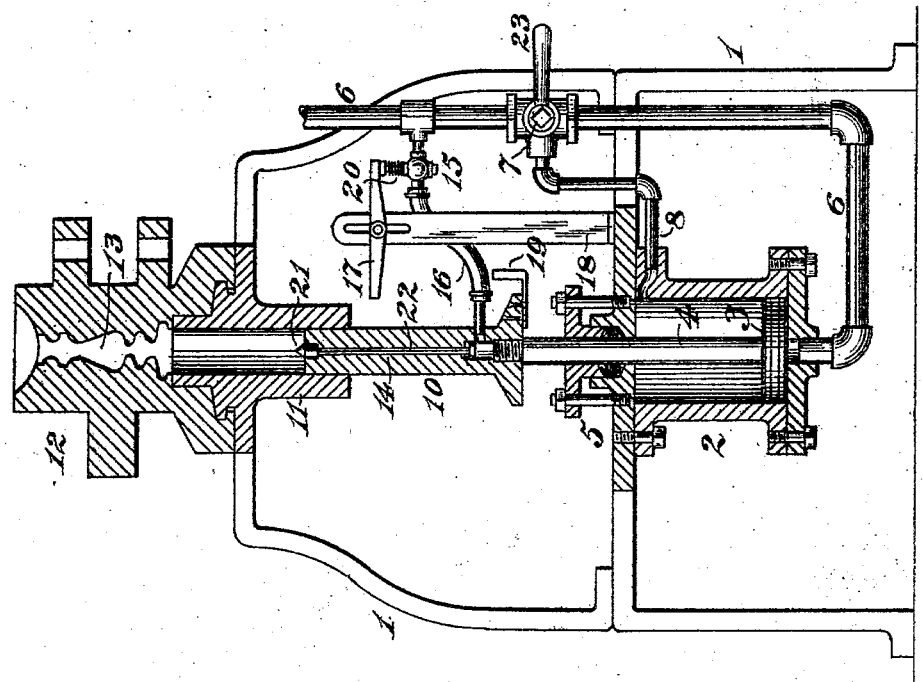
WITNESSES:
James C. Herron.
S. R. Bell.
INVENTOR,
Henry Schaub
by J. Howden Bell
Att'y.

UNITED STATES PATENT OFFICE.

HENRY SCHAUB, OF MOUNT PLEASANT, PENNSYLVANIA, ASSIGNOR TO BRYCE BROTHERS COMPANY, OF MOUNT PLEASANT, PENNSYLVANIA, A CORPORATION OF PENNSYLVANIA.

APPARATUS FOR THE MANUFACTURE OF GLASSWARE.

SPECIFICATION forming part of Letters Patent No. 704,761, dated July 15, 1902.

Application filed April 29, 1902. Serial No. 105,218. (No model.)

*To all whom it may concern:*

Be it known that I, HENRY SCHAUB, of Mount Pleasant, in the county of Westmoreland and State of Pennsylvania, have invented a certain new and useful Improvement in Apparatus for the Manufacture of Glassware, of which improvement the following is a specification.

The object of my invention is to provide simple and inexpensive means whereby the manufacture of hollow-stemmed articles of glassware may be effected expeditiously at low cost and without involving the employment of skilled labor.

The improvement claimed is hereinafter fully set forth.

In the accompanying drawings, Figure 1 is a vertical central section, partly in elevation, through an apparatus for the manufacture of glassware in accordance with my invention; Fig. 2, a similar section through the upper portion of the same, showing the plunger at the terminal of its working stroke; and Fig. 3, a section, on an enlarged scale, through the operating-cock.

In the practice of my invention the body or bowl of the glass article is blown and placed while hot upon the top of a mold having a cavity shaped in correspondence with the stem, which is formed by pressing a proper quantity or gathering of glass in the mold-cavity. A longitudinal cavity is then blown in the stem by the introduction of an air-blast thereinto while it is hot and plastic and confined against outward change of form. The stem and foot may be pressed integrally, or the foot may be made separately and united to the stem after the cavity has been blown therein and while the glass is hot.

In the apparatus shown in the drawings which constitutes my invention I provide a supporting-frame 1, to the lower portion of which is connected an air-cylinder 2, in which is fitted a piston 3, secured upon a piston-rod 4, which passes through a properly-packed stuffing-box 5 in the upper head of the cylinder 2. An air-supply pipe 6, leading from a reservoir, compressor, or other source of air under pressure, which is not shown, and controlled by a two-way operating cock or valve 7, opens into the lower end of the cylinder 2, and a pipe 8 leads from the upper end of the cylinder to the casing of the operating-cock 7, in which casing there is formed an atmospheric exhaust port or passage 9.

A plunger 10, which is connected to the upper end of the piston-rod 4 in line axially therewith, is fitted to traverse in a cylinder 11, secured upon the upper portion of the frame 1, and the upper end of the cylinder 11 is open to a two-part mold 12, which is supported on the frame immediately above it. The cavity or internal space 13 of the mold is made of the form desired to be imparted to the stems which are to be manufactured, which may either be made with integral feet or have their feet separately made and subsequently attached, as preferred. An air-passage 14 is formed centrally in the plunger 10 and is connected at its lower end by a flexible hose 16 with an air-supply cock or valve 15, controlling communication between it and the air-supply pipe 6. A double-armed valve-lever 17 is pivoted centrally on a standard 18, fixed to the frame, one arm of said lever fitting against the stem of the air-supply valve and the other projecting in position to be contacted with and moved by a tappet 19, fixed to the plunger 10, when the latter approaches the terminal of its upward or working stroke, thereby opening the air-valve by the pressure of the opposite arm on the stem thereof. The air-valve is closed and the lever 17 returned to normal position by a spring 20, when the tappet 19 is withdrawn from contact with the lever by the downward movement of the plunger. The upper end of the air-passage 14 is controlled by an automatically-operative valve 21, which is fixed upon a stem 22, passing through the air-passage and made of smaller diameter than the latter or provided with longitudinal grooves on its periphery, so as to permit free passage of air, and the valve is normally held seated by its own weight and that of the glass in the cylinder and mold above it. The operating-cock 7 is manually actuated by a handle 23.

In the operation of the above-described apparatus the bowl or body c of the glass article is blown in a suitable mold. A gathering of glass of proper quantity to form the stem or the stem and foot, as the case may be, is supplied to the cylinder 11 and the hot bowl or body is set upon the top of the mold 12. The operating-cock 7 is then turned into position to admit compressed air to the cylinder 2 on the lower side of its piston 3, which is thereby elevated, carrying with it the plunger 10, by the action of which the stem $a$ is formed by pressing the glass into the cavity of the mold 12. As the plunger approaches the terminal of its upward or working stroke the connected tappet 19 comes in contact with the valve-lever 17 and swings the latter upon its central bearing, thereby opening the air-supply valve 15 and admitting compressed air from the supply-pipe 6 through the flexible hose 16 to the central passage 14. The air-blast thus admitted unseats the valve 21 and passing into the mold 12 blows a central cavity or space $b$ in the stem. By shifting the operating-cock 7 into position to cut off the supply of air to the lower end of the cylinder 2 and open communication between the same and the exhaust-passage 9 and between the pipe 8, leading into the upper end of the cylinder 2 and the supply-pipe 6, the piston 3 and connected plunger 10 are forced downwardly into the position shown in Fig. 1, in which they are in readiness for a succeeding operation. When the tappet 19 is withdrawn from contact with the valve-lever 17 in the downward traverse of the plunger, the air-valve 15 is closed by its spring 20, and the plunger-valve 21 is seated by its own gravity. The goblet or other glass article is removed by opening the two-part mold 12, and its mouth is finished in the ordinary manner. If the stem is made without a foot, the foot is subsequently attached.

I claim as my invention and desire to secure by Letters Patent—

1. In an apparatus for the manufacture of glassware, the combination of a fluid-pressure cylinder, a piston and rod working therein, a pressing-plunger connected with the piston-rod, a cylinder in which said plunger reciprocates, a partible press-mold communicating with said cylinder, and means for admitting an air-blast to the press-mold.

2. In an apparatus for the manufacture of glassware, the combination of a fluid-pressure cylinder, a piston and rod working therein, a pressing-plunger connected with the piston-rod, a cylinder in which said plunger reciprocates, a partible press-mold communicating with said cylinder, means for admitting an air-blast to the press-mold, and means for controlling the admission of the air-blast by the traverse of the plunger.

3. In an apparatus for the manufacture of glassware, the combination of a fluid-pressure cylinder, a piston and rod working therein, a pressing-plunger connected with the piston-rod, a cylinder in which said plunger reciprocates, a partible press-mold communicating with said cylinder, a passage extending through the plunger, a flexible air-supply conduit leading into said passage, an automatically-operating valve controlling communication between said conduit and the press-mold, an air-supply valve controlling the air-supply conduit, a valve-lever adapted to open said supply-valve, and a tappet fixed to the plunger, in position to actuate the valve-lever.

4. In an apparatus for the manufacture of glassware, the combination of a fluid-pressure cylinder, a piston and rod working therein, a pressing-plunger connected with the piston-rod and having a longitudinal air-passage, a cylinder in which said plunger reciprocates, a partible press-mold communicating with said cylinder, an automatically-operative valve seating in the air-passage of the plunger and controlling communication between said passage and the press-mold, a flexible air-supply conduit leading into said passage, an air-supply valve controlling said conduit, a valve-lever adapted to operate said supply-valve, and a tappet fixed to the plunger in position to actuate the valve-lever.

HENRY SCHAUB.

Witnesses:
 HUGH CLOSE,
 W. A. KALP.